Patented Apr. 9, 1929.

1,708,099

UNITED STATES PATENT OFFICE.

HERMAN PAUL KERNEN, OF WILMETTE, ILLINOIS.

PROCESS OF MAKING CHEESE.

No Drawing.   Application filed February 18, 1927. Serial No. 169,411.

This invention relates to improvements in the process of making cheese; and more especially to such a process for making a sterile cheese directly from milk.

One of the features of my invention is the fact that by the use of my improved process cheese can be made in a very short space of time. Heretofore, it was considered necessary, in the making of cheese to permit the curd to stand for some time to give the requisite acid development. By the old methods of making cheese, if this acid development was carried out by artificial means or hastened, the resulting cheese would be imperfect and non-marketable as it would not have the necessary consistency but would break up and disintegrate, or the said development would continue to produce a sour or undesirable flavor. In my improved process, however, the acid development may be carried out artificially and hastened so that the complete time for the manufacture of cheese may be considerably shortened; and at the same time the completed cheese has the requisite consistency and is a perfect marketable and palatable product in every respect, and also being sterile the acid development is stopped at the right point so that the desired flavor remains.

Another feature of my invention is the fact that by the use of my process the completed cheese is sterilized, thus making it keep better and longer under different climatic conditions.

Other features and advantages of my invention will appear more fully as I proceed with my specification.

In the practice of my invention, I take preferably fresh whole milk, cook the same to approximately 85° F. cool it if desired, and coagulate the same by rennet extract, pepsin, or similar substance to a jelly mass in the usual manner. I then cut the jelly mass into small pieces of substantially the same size, heat for about thirty minutes to from 100 to 105° F. stirring while heating, to form curds, and then remove the excess whey and moisture from the curds in any one of the well known methods depending upon the kind of resulting cheese desired.

I then cut the curds preferably into small pieces each about one cubic inch in size and develop the requisite acidity to give the taste desired. The amount of acidity, of course, will depend upon the acidity contained in the milk and upon the character and taste of the resulting cheese. In the practice of my invention, this acidity may be developed relatively rapidly and by artificial means if desired. The natural development of the acidity also may be hastened by artificial means. For example, I have found, that by allowing the curds to stand in a warm place, say at 85 to 105° F., the requisite acidity may be developed within ten hours, or even less.

When the desired acidity has been developed, I process or sterilize the curds by placing them in a steam jacketed kettle, preferably add an emulsifying agent, for example, sodium citrate, and heat to a temperature approximaately from 120 to 150° F. I hold the mass at this heat for about fifteen to thirty minutes, preferably add some salt, and agitate until a smooth and homogeneous mass is obtained. When thus processed or sterilized, the cheese is ready to be put into containers or moulds and is completely ready for market. Obviously, the processing or sterilizing may be carried on in other ways, the essence of this step being to subject the curds to sufficient heat for a sufficient length of time to process or sterilize the same.

It will be seen that by the practice of my invention, cheese may be completely manufactured within a relatively short space of time. For example, the entire process may be completed within ten or twelve hours; thus enabling one to manufacture complete sterilized cheese from milk within this very short space of time. In the older processes it frequently required days and weeks to make a complete satisfactory marketable cheese from milk. In these older processes the extra length of time was demanded in the development of the requisite acidity in the curds. As has been stated, by the use of my process, this acidity development can be accomplished or hastened by artificial means without injuring the completed product.

Although I have described a particular process for carrying out my invention, it is to be understood that variations may be made in the same without departing from the spirit and scope of my invention as embodied in the claims in which it is my desire to claim all novelty inherent in my invention as broadly as possible, in view of the prior art.

One of the important features of this invention is the making of sterile cheese directly from milk in one continuous process without having a non-sterile cheese at any time. Heretofore sterile cheese has been made only by recooking or sterilizing completed factory made cheese.

What I claim as new, and desire to secure by Letters Patent, is:

1. The process of making sterile cheese comprising, coagulating the milk, forming the curds, developing the requisite acidity in the curds in a relatively short space of time, sterilizing the mass, and allowing the same to cool.

2. The process of making sterile cheese comprising, coagulating the milk, forming the curds, hastening the development of acidity in the curds, sterilizing the mass, and allowing the same to cool.

3. The process of making cheese comprising, coagulating the milk, forming the curds, developing the requisite acidity in the curds by placing them in a warm place for a relatively short space of time, sterilizing the mass, and allowing the same to cool.

4. The process of making cheese, comprising, coagulating the milk, forming the curds, developing the requisite acidity in the curds by placing them in a temperature of from 85 to 105° F. for approximately ten hours, sterilizing the mass, and allowing the same to cool.

5. The process of making sterile cheese, comprising, coagulating the milk, forming the curds, developing the requisite acidity in the curds in a relatively short space of time, sterilizing the mass in the presence of an emulsifying agent, and allowing the same to cool.

6. The process of making cheese comprising, coagulating the milk, forming the curds, developing the requisite acidity in the curds in a relatively short space of time, melting the mass, stirring the mass during melting and while melted and maintained at a temperature between 120° F. and 150° F. until brought to a substantially stable homogeneous condition, and then placing the same in suitable sealed containers and subjecting it to a temperature in excess of 160° F. maintained for a period of not less than fifteen minutes.

7. The process of making cheese comprising, coagulating the milk, forming the curds, developing the requisite acidity in the curds by artificial means in a relatively short space of time, melting the mass, stirring the mass during melting and while melted and maintained at a temperature between 120° F. and 150° F. until brought to a substantially stable homogeneous condition, and then placing the same in suitable sealed containers and subjecting it to a temperature in excess of 160° F. maintained for a period of not less than fifteen minutes.

8. The process of making sterilized cheese comprising, coagulating the milk, forming the curds, hastening the development of acidity in the curds by artificial means, melting the mass, stirring the mass during melting and while melted and maintained at a temperature between 120° F. and 150° F. until brought to a substantially stable homogeneous condition, and then placing the same in suitable sealed containers and subjecting it to a temperature in excess of 160° F. maintained for a period of not less than fifteen minutes.

9. The process of making cheese comprising, coagulating the milk, forming the curds, hastening the development of acidity in the curds by artificial means, melting and stirring the mass to bring it to a substantially stable homogeneous condition, placing the same in suitable sealed containers, and subjecting it to a sterilizing temperature for a sufficient length of time to sterilize.

10. The process of making cheese comprising, coagulating the milk, forming the curds, developing the requisite acidity in the curds by artificial means in a relatively short space of time, melting and stirring the mass until brought to a substantially stable homogeneous condition, placing the mass in suitable sealed containers, and subjecting it to a sterilizing temperature for a sufficient length of time to sterilize.

11. The process of making cheese comprising, coagulating the milk, forming the curds, hastening the development of acidity in the curds by artificial means, melting and stirring the mass to bring it to a substantially stable homogeneous condition, placing the same in suitable sealed containers, and subjecting it to a temperature in excess of 160° F. maintained for a period of not less than fifteen minutes.

12. The process of making cheese comprising, coagulating the milk, forming the curds, developing the requisite acidity in the curds by artificial means in a relatively short space of time, melting and stirring the mass until brought to a substantially stable homogeneous condition, placing the mass in suitable sealed containers, and subjecting it to a temperature in excess of 160° F. maintained for a period of not less than fifteen minutes.

13. The process of making a sterile cheese directly from milk by one continuous process consisting, of coagulating the milk, forming the curds, developing the requisite acidity in the curds by artificial means in a relatively short space of time, sterilizing the mass, and allowing the same to cool.

14. The process of making a sterile cheese directly from milk by one continuous process consisting, of coagulating the milk, forming the curds, developing the requisite acidity in the curds by artificial means in a relatively short space of time, sterilizing the mass while stirring, and allowing the same to cool.

In witness whereof, I have hereunto set my hand this 16th day of February, A. D. 1927.

HERMAN PAUL KERNEN.